US011127960B2

(12) United States Patent
Norimoto (10) Patent No.: US 11,127,960 B2
(45) Date of Patent: Sep. 21, 2021

(54) PROCESSING METHOD FOR FUEL CELL SYSTEM, COMPONENT DETACHING METHOD, AND FUEL CELL SYSTEM

(71) Applicant: TOYOTA JIDOSHA KABUSHIKI KAISHA, Toyota (JP)

(72) Inventor: Michito Norimoto, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 147 days.

(21) Appl. No.: 16/521,869

(22) Filed: Jul. 25, 2019

(65) Prior Publication Data
US 2020/0091527 A1 Mar. 19, 2020

(30) Foreign Application Priority Data
Sep. 18, 2018 (JP) .............................. JP2018-173522

(51) Int. Cl.
| | |
|---|---|
| *H01M 8/04225* | (2016.01) |
| *H01M 8/2465* | (2016.01) |
| *H01M 8/04858* | (2016.01) |
| *H01M 8/04089* | (2016.01) |
| *H01M 8/04537* | (2016.01) |
| *H01M 8/04228* | (2016.01) |

(52) U.S. Cl.
CPC ..... *H01M 8/04225* (2016.02); *H01M 8/0488* (2013.01); *H01M 8/04089* (2013.01); *H01M 8/04228* (2016.02); *H01M 8/04559* (2013.01); *H01M 8/2465* (2013.01)

(58) Field of Classification Search
CPC ......... H01M 8/04225; H01M 8/04228; H01M 8/04089; H01M 8/04559; H01M 8/0488; H01M 8/2465
See application file for complete search history.

(56) References Cited

U.S. PATENT DOCUMENTS

| | | | | |
|---|---|---|---|---|
| 2011/0250516 A1* | 10/2011 | Tsukada | ............ | H01M 8/04228 429/429 |
| 2013/0017458 A1* | 1/2013 | Umeda | ............. | H01M 8/04955 429/410 |

FOREIGN PATENT DOCUMENTS

JP 2004-165028 6/2004

\* cited by examiner

*Primary Examiner* — Olatunji A Godo
(74) *Attorney, Agent, or Firm* — Finnegan, Henderson, Farabow, Garrett & Dunner, LLP (57) ABSTRACT

A processing method for a fuel cell system including a fuel cell stack configured to generate electric power when supplied with an anode gas and a cathode gas is started in a state in which the fuel cell stack is not supplied with the anode gas and the cathode gas and generation of electric power in the fuel cell stack is stopped. The processing method includes: a first process of starting supply of the cathode gas; a second process of starting supply of an inert gas to an anode when a voltage of the fuel cell stack increases and then becomes equal to or less than a predetermined first voltage; and a third process of stopping the supply of the inert gas when the voltage of the fuel cell stack increases and then becomes equal to or less than a predetermined second voltage after the second process.

8 Claims, 6 Drawing Sheets

| STACK STATE | | LEFT | CATHODE AIR REPLACEMENT | | ANODE NITROGEN REPLACEMENT | |
|---|---|---|---|---|---|---|
| TIME POINT | | (a) | (b) | (c) | (d) | (e) |
| ANODE | HYDROGEN-BASED PIPE, STACK MANIFOLD | HYDROGEN | HYDROGEN | HYDROGEN | NITROGEN | NITROGEN |
| | VICINITY OF ELECTRODE | HYDROGEN / NITROGEN | HYDROGEN / NITROGEN | NITROGEN (CONSUMPTION OF HYDROGEN) | HYDROGEN | NITROGEN (PARTIAL HYDROGEN) |
| CATHODE | | HYDROGEN / NITROGEN | AIR | AIR | AIR | AIR |
| STACK VOLTAGE | | 0 | OCV | V1 | OCV | V2 |

FIG. 6

PROCESSING METHOD FOR FUEL CELL SYSTEM, COMPONENT DETACHING METHOD, AND FUEL CELL SYSTEM

INCORPORATION BY REFERENCE

The disclosure of Japanese Patent Application No. 2018-173522 filed on Sep. 18, 2018 including the specification, drawings and abstract is incorporated herein by reference in its entirety.

BACKGROUND

1. Technical Field

The disclosure relates to a processing method for a fuel cell system, a component detaching method, and a fuel cell system.

2. Description of Related Art

In examination of a fuel cell system or the like, discharging an anode gas such as hydrogen in the fuel cell system and decreasing a voltage of a fuel cell system are required from the viewpoint of safety. Japanese Unexamined Patent Application Publication No. 2004-165028 (JP 2004-165028 A) discloses a technique of discharging a voltage remaining in a fuel cell stack when generation of power in the fuel cell stack is stopped.

SUMMARY

In the technique disclosed in JP 2004-165028 A, when a discharge process is started, supply of an inert gas to the fuel cell stack is first started and then it is determined whether the voltage of the fuel cell stack is lower than a predetermined value. When the voltage of the fuel cell stack is lower than the predetermined value, it is determined that discharge has been completed and the supply of the inert gas is stopped. However, when the fuel cell system is stopped, or the like, the voltage of the fuel cell stack at the time of starting of processing may be lower than the predetermined value. In this case, in the technique disclosed in JP 2004-165028 A, the supply of the inert gas to the fuel cell stack is immediately stopped after the discharge process has been started. Accordingly, in the technique disclosed in JP 2004-165028 A, when the voltage of the fuel cell stack is lower than the predetermined value, it may not be guaranteed that an anode gas is discharged from the fuel cell system. Accordingly, when the voltage of the fuel cell stack is lower than the predetermined value, the inert gas needs to be supplied for a long time in order to guarantee that the anode gas has been discharged.

The disclosure can be embodied in the following aspects.

According to an aspect of the disclosure, there is provided a processing method for a fuel cell system including a fuel cell stack configured to generate electric power when supplied with an anode gas and a cathode gas. The processing method is started in a state in which the fuel cell stack is not supplied with the anode gas and the cathode gas and generation of electric power in the fuel cell stack is stopped. The processing method includes: a first process of starting supply of the cathode gas to the fuel cell stack; a second process of starting supply of an inert gas to an anode of the fuel cell stack when a voltage of the fuel cell stack increases and then becomes equal to or less than a predetermined first voltage after the first process; and a third process of stopping the supply of the inert gas when the voltage of the fuel cell stack increases and then becomes equal to or less than a predetermined second voltage after the second process.

According to this aspect, when the voltage of the fuel cell stack increases and then becomes equal to or less than the first voltage after the first process, it means that an anode gas in the vicinity of the fuel cell stack has been consumed. When the voltage of the fuel cell stack increases and then becomes equal to or less than the second voltage after the second process, it means that an anode gas in an anode gas supply unit of the fuel cell system has moved to the vicinity of the fuel cell stack and has been consumed therein, that is, there is almost no anode gas in the anode gas supply unit. Accordingly, an anode gas discharge completion time point in the fuel cell system can be ascertained from changes in the voltage of the fuel cell stack. As a result, it is possible to prevent an inert gas from being unnecessarily supplied to the fuel cell system in order to guarantee that an anode gas has been discharged from the fuel cell system. It is also possible to shorten a time required for discharging an anode gas from the fuel cell system.

In the aspect, a pump that causes an anode off-gas discharged from the fuel cell stack to circulate to the fuel cell stack may be rotated at a time of the supply of the inert gas.

According to this aspect, it is possible to discharge the anode gas from the fuel cell system and to reuse the inert gas discharged from the fuel cell stack. Since discharge of the anode gas from the fuel cell system can be prompted, it is possible to further shorten a time required for discharging the anode gas.

In the aspect, when the voltage of the fuel cell stack reaches a predetermined third voltage and then becomes equal to or less than the first voltage, the supply of the inert gas to the anode of the fuel cell stack may be started in the second process and the first voltage may be lower than the third voltage. When the voltage of the fuel cell stack reaches a predetermined fourth voltage and then becomes equal to or less than the second voltage, the supply of the inert gas may be stopped in the third process and the second voltage may be lower than the fourth voltage.

In the aspect, rotation of the pump that causes an anode off-gas discharged from the fuel cell stack to circulate to the fuel cell stack may be stopped after the voltage of the fuel cell stack has been reached the fourth voltage in the third process.

In the aspect, the first process may be performed when an SOC of a secondary battery which is electrically connected to the fuel cell stack is equal to or greater than a predetermined threshold value.

In the aspect, a valve opening time of a discharge valve configured to shut off discharge of an anode off-gas discharged from the fuel cell stack to an outside of the fuel cell system may be increased or an open state of the discharge valve may be maintained while the first to third processes are being performed.

According to another aspect of the disclosure, there is provided a component detaching method. The component detaching method includes detaching a component of the fuel cell system from the fuel cell system after the processing method has been performed.

According to this aspect, a component can be safely detached from the fuel cell system. Since a discharge completion time point of an anode gas can be ascertained from changes in the voltage of the fuel cell stack, it is possible to start detachment of a component from the fuel cell system earlier in comparison with a case in which the discharge completion time point of an anode gas cannot be ascertained.

In the aspect, the component may include the fuel cell stack and a pump that causes an anode off-gas discharged from the fuel cell stack to circulate to the fuel cell stack.

According to another aspect of the disclosure, there is provided a fuel cell system. The fuel cell system includes: a fuel cell stack configured to generate electric power when supplied with an anode gas and a cathode gas; an anode gas supply unit configured to supply the anode gas to the fuel cell stack; a cathode gas supply unit configured to supply the cathode gas to the fuel cell stack; a voltage measuring unit configured to measure a voltage of the fuel cell stack; an inert gas supply unit configured to supply an inert gas to an anode of the fuel cell stack; and a control unit configured to perform a process of discharging the anode gas from an inside of the fuel cell system to an outside of the fuel cell system. In a state in which the fuel cell stack is not supplied with the anode gas and the cathode gas and generation of electric power in the fuel cell stack is stopped, the control unit is configured to cause the cathode gas supply unit to start supply of the cathode gas to the fuel cell stack, to cause the inert gas supply unit to start supply of the inert gas to the anode of the fuel cell stack when the voltage detected by the voltage measuring unit increases and then becomes equal to or less than a predetermined first voltage after the supply of the cathode gas has been started, and to cause the inert gas supply unit to stop the supply of the inert gas when the voltage measured by the voltage measuring unit increases and then becomes equal to or less than a predetermined second voltage after the supply of the inert gas has been started.

The disclosure may be embodied in various forms other than the processing method for a fuel cell system and the component detaching method. For example, the disclosure may be embodied in forms such as a computer program for embodying the above-mentioned method and a non-transitory recording medium having the computer program recorded thereon.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

A1. Configuration of Fuel Cell System

Figure 1:
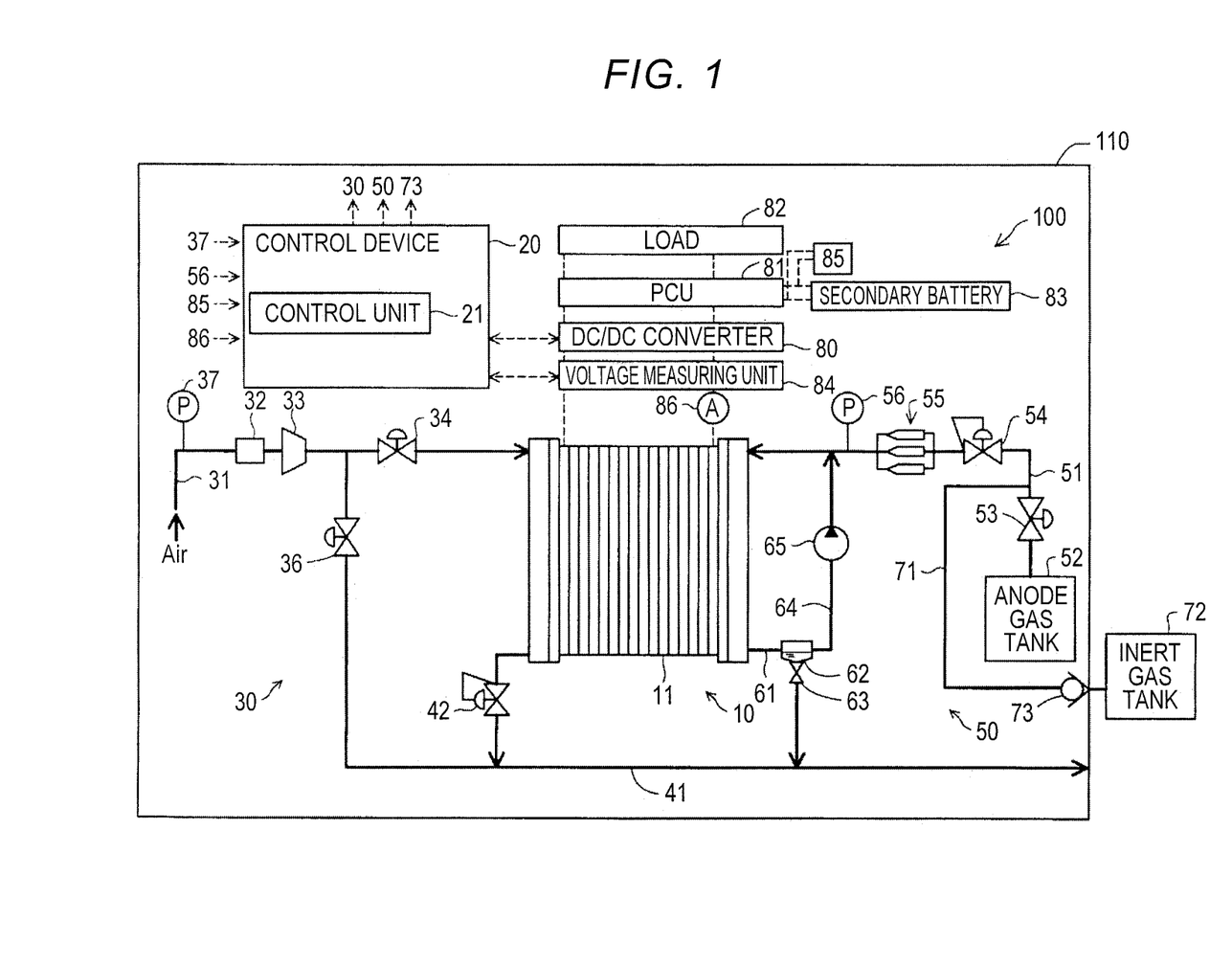
FIG. 1 is a diagram schematically illustrating the configuration of a fuel cell system according to an embodiment of the disclosure.

FIG. 1 is a diagram schematically illustrating the configuration of a fuel cell system 100 according to an embodiment of the disclosure. The fuel cell system 100 according to this embodiment is mounted, for example, in a vehicle 110. The fuel cell system 100 outputs electric power serving as a power source of the vehicle 110 in response to a request from a driver.

The fuel cell system 100 includes a fuel cell stack 10, a control device 20, a cathode gas supply unit 30, an anode gas supply unit 50, a DC/DC converter 80, a power control unit (hereinafter referred to as a "PCU") 81, a load 82, and a secondary battery 83. The control device 20 is constituted by one or more electronic control units (ECUs) including a central processing unit (CPU), a memory, and an interface. The control device 20 serves as a control unit 21 by loading and executing a program stored in the memory.

The fuel cell stack 10 has a stacked structure in which cells 11 are stacked. Each cell 11 includes a membrane-electrode assembly including an electrolyte membrane and an anode electrode and a cathode electrode which are disposed on the surfaces of the electrolyte membrane and a pair of separators that sandwiches the membrane-electrode assembly between the separators. Each cell 11 is supplied with an anode gas and a cathode gas which are reactant gases and generates electric power. In the fuel cell stack 10, a side which is supplied with the anode gas is also referred to as an anode, and a side which is supplied with the cathode gas is also referred to as a cathode.

The cathode gas supply unit 30 includes a cathode gas pipe 31, an atmospheric pressure sensor 37, an air flow meter 32, a cathode gas compressor 33, a first on-off valve 34, a flow dividing valve 36, a cathode off-gas pipe 41, and a first regulator 42.

The atmospheric pressure sensor 37 is provided in the cathode gas pipe 31 and measures an atmospheric pressure by measuring an inlet pressure of the cathode gas pipe 31. The air flow meter 32 is provided in the cathode gas pipe 31 and measures a flow rate of air introduced thereinto. The cathode gas compressor 33 is connected to the fuel cell stack 10 via the cathode gas pipe 31. The cathode gas compressor 33 compresses the cathode gas introduced from the outside and supplies the compressed cathode gas to the fuel cell stack 10 under the control of the control unit 21.

The first on-off valve 34 is provided between the cathode gas compressor 33 and the fuel cell stack 10 and is opened or closed under the control of the control unit 21. The flow dividing valve 36 is provided between the cathode gas compressor 33 and the cathode off-gas pipe 41 and adjusts a flow rate of air flowing to the fuel cell stack 10 and the cathode off-gas pipe 41 under the control of the control unit 21.

The cathode off-gas pipe 41 discharges a cathode off-gas discharged from the fuel cell stack 10 to the outside of the fuel cell system 100. The first regulator 42 adjusts the pressure at a cathode gas outlet of the fuel cell stack 10 under the control of the control unit 21.

The anode gas supply unit 50 includes an anode gas pipe 51, an anode gas tank 52, a second on-off valve 53, a second regulator 54, an injector 55, an anode pressure sensor 56, an anode off-gas pipe 61, a gas-liquid separator 62, a discharge valve 63, a circulation pipe 64, and an anode gas pump 65.

The anode gas pipe 51 is a supply flow passage for supplying the anode gas to the fuel cell stack 10. The anode gas tank 52 is connected to an anode gas inlet manifold of the fuel cell stack 10 via the anode gas pipe 51 and supplies the anode gas charged therein to the fuel cell stack 10. The second on-off valve 53, the second regulator 54, and the injector 55 are provided in the anode gas pipe 51 sequentially in this order from an upstream side, that is, the side close to the anode gas tank 52. The second on-off valve 53 is opened or closed under the control of the control unit 21. The second regulator 54 adjusts the pressure of the anode gas upstream from the injector 55 under the control of the control unit 21. The anode pressure sensor 56 is provided downstream from the injector 55 in the anode gas pipe 51. The anode pressure sensor 56 measures a pressure value at a portion downstream from the injector 55.

The injector 55 is an on-off valve that is electromagnetically driven based on a drive cycle or a valve opening time which is set by the control unit 21, and adjusts an amount of anode gas supplied to the fuel cell stack 10. In this embodiment, a plurality of the injectors 55 is provided in the anode gas pipe 51. The control unit 21 controls the drive cycle or the valve opening time of the injector 55 such that a value measured by the anode pressure sensor 56 is not less than a target pressure value, and controls the amount of anode gas supplied to the fuel cell stack 10. The target pressure value is determined according to a required power for the fuel cell stack 10.

The anode off-gas pipe 61 connects an anode off-gas outlet manifold of the fuel cell stack 10 and the cathode off-gas pipe 41 to each other. The anode off-gas pipe 61 is a discharge flow passage for discharging an anode off-gas from the fuel cell stack 10. The anode off-gas includes an anode gas which has not been used for power generation reactions and nitrogen gas.

The gas-liquid separator 62 is provided in the anode off-gas pipe 61. The gas-liquid separator 62 separates water which is impurities from the anode off-gas discharged from the fuel cell stack 10 and stores the separated water.

The discharge valve 63 is an on-off valve that is provided in the anode off-gas pipe 61. The discharge valve 63 is provided vertically below the gas-liquid separator 62. The discharge valve 63 is opened or closed under the control of the control unit 21. When the discharge valve 63 is opened, water in the gas-liquid separator 62 and the anode off-gas are discharged from the discharge valve 63. The water and the anode off-gas discharged from the discharge valve 63 are discharged to the outside via the cathode off-gas pipe 41 connected to the anode off-gas pipe 61.

The circulation pipe 64 connects the gas-liquid separator 62 to a part of the anode gas pipe 51 downstream from the injector 55. The anode gas pump 65 is provided in the circulation pipe 64. The anode gas pump 65 is driven under the control of the control unit 21 and sends the anode off-gas from which water has been separated by the gas-liquid separator 62 to the anode gas pipe 51. In the fuel cell system 100, the anode off-gas including the anode gas is circulated and is supplied again to the fuel cell stack 10, whereby usage efficiency of the anode gas is improved.

The DC/DC converter 80 steps up a voltage output from the fuel cell stack 10 and supplies the stepped-up voltage to the PCU 81 under the control of the control unit 21. The PCU 81 has an inverter incorporated therein and supplies electric power to the load 82 such as a traction motor for driving vehicle wheels via the inverter under the control of the control unit 21. The PCU 81 controls an output current of the fuel cell stack 10 based on a command from the control unit 21.

The secondary battery 83 is charged with electric power which is generated by the fuel cell stack 10 via the DC/DC converter 80 and the PCU 81. The secondary battery 83 functions as a supply source of electric power in the fuel cell system 100 along with the fuel cell stack 10. The electric power of the secondary battery 83 is supplied to the load 82, the cathode gas compressor 33, the anode gas pump 65, and various valves. A lithium-ion battery, a lead storage battery, a nickel-cadmium battery, a nickel-hydride battery, or the like can be used as the secondary battery 83.

A state of charge (SOC) detecting unit 85 detects a temperature, an output voltage, and an output current of the secondary battery 83. The SOC detecting unit 85 detects a state of charge (SOC) of the secondary battery 83 based on the detected values. An SOC is a ratio of an amount of charged electricity to an electric capacity.

A current sensor 86 measures the output current of the fuel cell stack 10. A voltage measuring unit 84 measures the voltage of the fuel cell stack 10. The voltage measuring unit 84 can calculate an average cell voltage from the voltage of the fuel cell stack 10. An "average cell voltage" is a value obtained by dividing a voltage across both terminals of a fuel cell by the number of cells 11.

The control unit 21 controls the units of the fuel cell system 100 based on required power and controls the output of the fuel cell stack 10 or the secondary battery 83. The required power includes an external power generation request from a driver of the vehicle 110 in which the fuel cell system 100 is mounted and an internal power generation request for supplying electric power to auxiliary machinery of the fuel cell system 100.

The control unit 21 performs processing of the fuel cell system 100 for discharging an anode gas from the fuel cell system 100. For example, when a component is detached from the fuel cell system 100 at the time of examination of the vehicle 110 including the fuel cell system 100, at the time of occurrence of an abnormality in the vehicle 110, or the like, this processing is performed before detachment of a component. The component which is to be detached is at least one of a plurality of components of the fuel cell system 100. Examples of the component include the fuel cell stack 10 and the anode gas pump 65.

In FIG. 1, an inert gas pipe 71 for supplying an inert gas to an anode of the fuel cell stack 10, an inert gas tank 72, and a check valve 73 are additionally illustrated. In this embodiment, a pipe that connects an anode gas charging port (not illustrated) provided in the vehicle 110 to a part between the second on-off valve 53 and the second regulator 54 in the anode gas pipe 51 is used as the inert gas pipe 71. The check valve 73 is provided in the anode gas charging port. When the inert gas tank 72 is connected to the anode gas charging port and the second regulator 54 and the injector 55 are opened in a state in which the second on-off valve 53 is closed, an inert gas is supplied from the inert gas tank 72 to the anode of the fuel cell stack 10 via the inert gas pipe 71 and the anode gas pipe 51. A part of the anode gas pipe 51 downstream from the second on-off valve 53, the inert gas pipe 71, the inert gas tank 72, the check valve 73, the second regulator 54, and the injector 55 may be collectively referred to as an inert gas supply unit.

A2. Component Detaching Method

Figure 2:
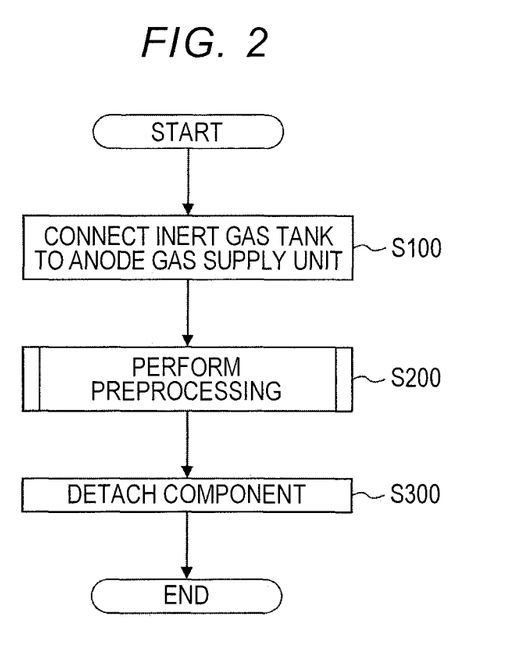
FIG. 2 is a flowchart illustrating a component detaching method.

FIG. 2 is a flowchart illustrating a component detaching method. The component detaching method illustrated in FIG. 2 is performed in an agency or a factory of the vehicle 110. At the time of starting of the component detaching method, an anode gas and a cathode gas are not supplied to the fuel cell stack 10 and generation of electric power in the fuel cell stack 10 is stopped. In this embodiment, at the time of starting of the component detaching method, a start switch of the vehicle 110 is turned off and supply of a reactant gas from the cathode gas supply unit 30 and the anode gas supply unit 50 to the fuel cell stack 10 is stopped. At the time of starting of the component detaching method, a residual voltage of the fuel cell stack 10 is almost zero.

In step S100, the inert gas tank 72 is connected to the anode gas supply unit 50 by an operator. In this embodiment, in step S110, a nitrogen gas container serving as the inert gas tank 72 is connected to the anode gas charging port of the vehicle 110 by an operator after the second on-off valve 53 and the second regulator 54 have been closed.

In step S200, the processing of the fuel cell system 100 is performed before detachment of a component. The process of step S200 which is performed before detachment of a component is also simply referred to as "preprocessing." Details of the preprocessing will be described later.

After the preprocessing has ended, a component is detached from the fuel cell system 100 by the operator in step S300. The detached component is examined, repaired, or replaced.

A3. Processing of Fuel Cell System

Figure 3:
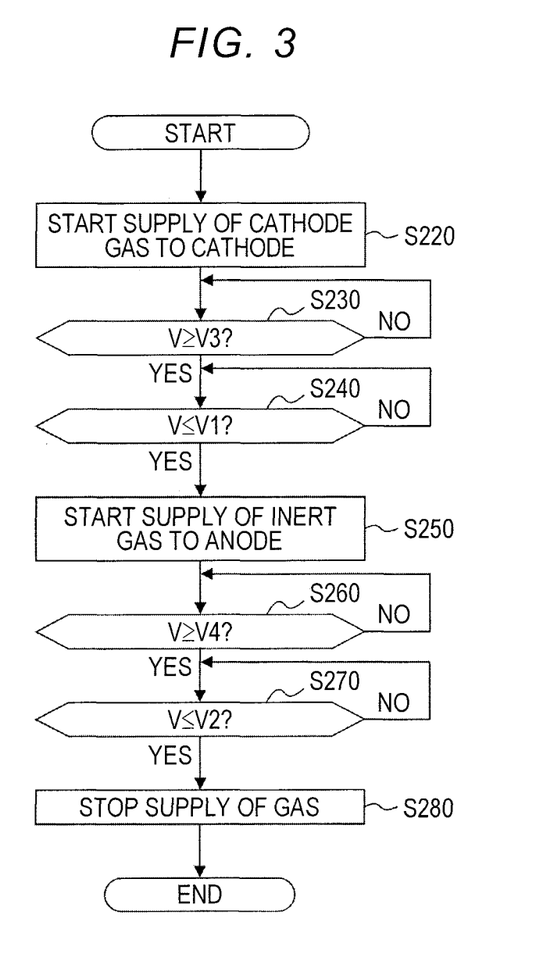
FIG. 3 is a flowchart illustrating a processing method for the fuel cell system.

FIG. 3 is a flowchart illustrating the processing of the fuel cell system 100 in step S200. This processing is also preprocessing for safely detaching a component from the fuel cell system 100. In this embodiment, the control unit 21 starts the preprocessing when a start signal is input to the control unit 21. The start signal is input, for example, from the outside of the fuel cell system 100 by the operator. The control unit 21 may start the preprocessing when predetermined conditions stored in the memory of the control device 20 are satisfied. The predetermined conditions may include, for example, conditions that a shift lever of the vehicle 110 is located at a parking range, generation of electric power in the fuel cell stack 10 is stopped, and information indicating that the inert gas tank 72 is connected to the anode gas supply unit 50 is input to the control unit 21. In this embodiment, the control unit 21 performs the preprocessing using electric power of the secondary battery 83.

In step S220, the control unit 21 controls the cathode gas supply unit 30 such that supply of air serving as the cathode gas to the cathode is started. Step S220 is also referred to as a "first process." In step S220, the control unit 21 may rotate the cathode gas compressor 33 at a predetermined rotation speed. The predetermined rotation speed is a speed for supplying the cathode gas to a plurality of cells 11 of the fuel cell stack 10 while preventing excessive drying of the electrodes of the cells 11. The predetermined rotation speed is acquired by experiment or simulation in advance and is stored in the memory of the control device 20. The predetermined rotation speed may be a rotation speed at which the cathode gas compressor 33 can achieve supply of a cathode gas at about 200 (NL/min). When supply of a cathode gas is started, an anode gas in the vicinity of the electrodes of the fuel cell stack 10 reacts with the supplied cathode gas. Accordingly, the voltage of the fuel cell stack 10 which is almost zero at the time of starting of the preprocessing increases.

Subsequently, in step S230, the control unit 21 determines whether the voltage acquired from the voltage measuring unit 84 has reached a predetermined third voltage V3. The third voltage V3 is almost the same value as an open-circuit voltage (OCV) of the fuel cell stack 10. The third voltage V3 may be a value obtained by multiplying the open-circuit voltage by a value between 0.9 and 1.0. When the voltage of the fuel cell stack 10 has reached the third voltage V3, the control unit 21 performs the process of step S240.

In step S240, the control unit 21 determines whether the voltage acquired from voltage measuring unit 84 is equal to or less than a predetermined first voltage V1. The first voltage V1 is a value which is lower than the third voltage V3. The first voltage V1 is a voltage value which is acquired by experiment or simulation when there is no anode gas in the vicinity of the electrodes of the fuel cell stack 10. The first voltage V1 may be a value obtained by multiplying the number of cells 11 in the fuel cell stack 10 by a value of 0.1 V. When the voltage acquired from the voltage measuring unit 84 is equal to or less than the first voltage V1, the control unit 21 performs the process of step S250.

When the determination results of steps S230 and S240 are positive, that is, when the voltage of the fuel cell stack 10 increases and then decreases to be equal to or less than the first voltage V1 by supply of a cathode gas, it means that an anode gas in the vicinity of the electrodes of the fuel cell stack 10 is consumed by electrochemical reactions. In other words, when the determination results of steps S230 and S240 are positive, it means that there is almost no anode gas in the vicinity of the electrodes of the fuel cell stack 10.

In step S250, the control unit 21 controls the anode gas supply unit 50 such that supply of an inert gas to the anode is started. In this embodiment, the control unit 21 opens the second regulator 54 and the injector 55. By performing step S250, an anode gas present downstream from a connection part between the inert gas pipe 71 and the anode gas pipe 51 in the anode gas supply unit 50 moves to the fuel cell stack 10. The anode gas moving to the vicinity of the fuel cell stack 10 reacts with the cathode gas. Accordingly, the voltage of the fuel cell stack 10 which has been equal to or less than the first voltage V1 increases. The processes from steps S230 to step S250 are also referred to as a "second process." In this embodiment, the inert gas is nitrogen gas. The inert gas may be argon gas in another embodiment.

Subsequently, in step S260, the control unit 21 determines whether the voltage acquired from the voltage measuring unit 84 is equal to or greater than a predetermined fourth voltage V4. The fourth voltage V4 is almost the same value as the open-circuit voltage. The fourth voltage V4 may be a value obtained by multiplying the open-circuit voltage by a value between 0.9 and 1.0. When the voltage of the fuel cell stack 10 is equal to or greater than the fourth voltage V4, the control unit 21 performs the process of step S270.

In step S270, the control unit 21 determines whether the voltage acquired from the voltage measuring unit 84 is equal to or less than a predetermined second voltage V2. The second voltage V2 is a value which is lower than the fourth voltage V4. The second voltage V2 is a voltage at which a component can be safely detached from the fuel cell system 100. The second voltage V2 may be a voltage value which is acquired by experiment or simulation in advance when an anode gas in the vicinity of the electrodes of the fuel cell stack 10 has been consumed. The second voltage V2 may be lower than the first voltage V1 or may be equal to the first voltage V1. When the voltage acquired from the voltage measuring unit 84 is equal to or less than the second voltage V2, the control unit 21 performs the process of step S280.

When the determination results of steps S260 and S270 are positive, that is, when the voltage of the fuel cell stack 10 increases and then decreases to the second voltage V2 by supply of an inert gas to the anode, it means that an anode gas remaining in the anode gas supply unit 50 moves to the fuel cell stack 10 and is consumed in the fuel cell stack 10. In other words, when the determination result of step S270 is positive, it means that there almost no anode gas in the vicinity of the electrodes of the fuel cell stack 10 and in a part of the anode gas supply unit 50 downstream from the connection part between the anode gas pipe 51 and the inert gas pipe 71.

In step S280, the control unit 21 controls the cathode gas supply unit 30 and the anode gas supply unit 50 such that supply of gas to the fuel cell stack 10 is stopped. Steps S260 to S280 are also referred to as a "third process." Through the above-mentioned processes, a series of preprocessing by the control unit 21 is performed.

When the determination results of steps S230, S240, S260, and S270 in the preprocessing are not positive and a predetermined time has elapsed after the steps have been started, the control unit 21 may end the preprocessing. In this case, for example, the control unit 21 may output information indicating that the preprocessing has not ended normally to an output device which is not illustrated.

Figure 4:
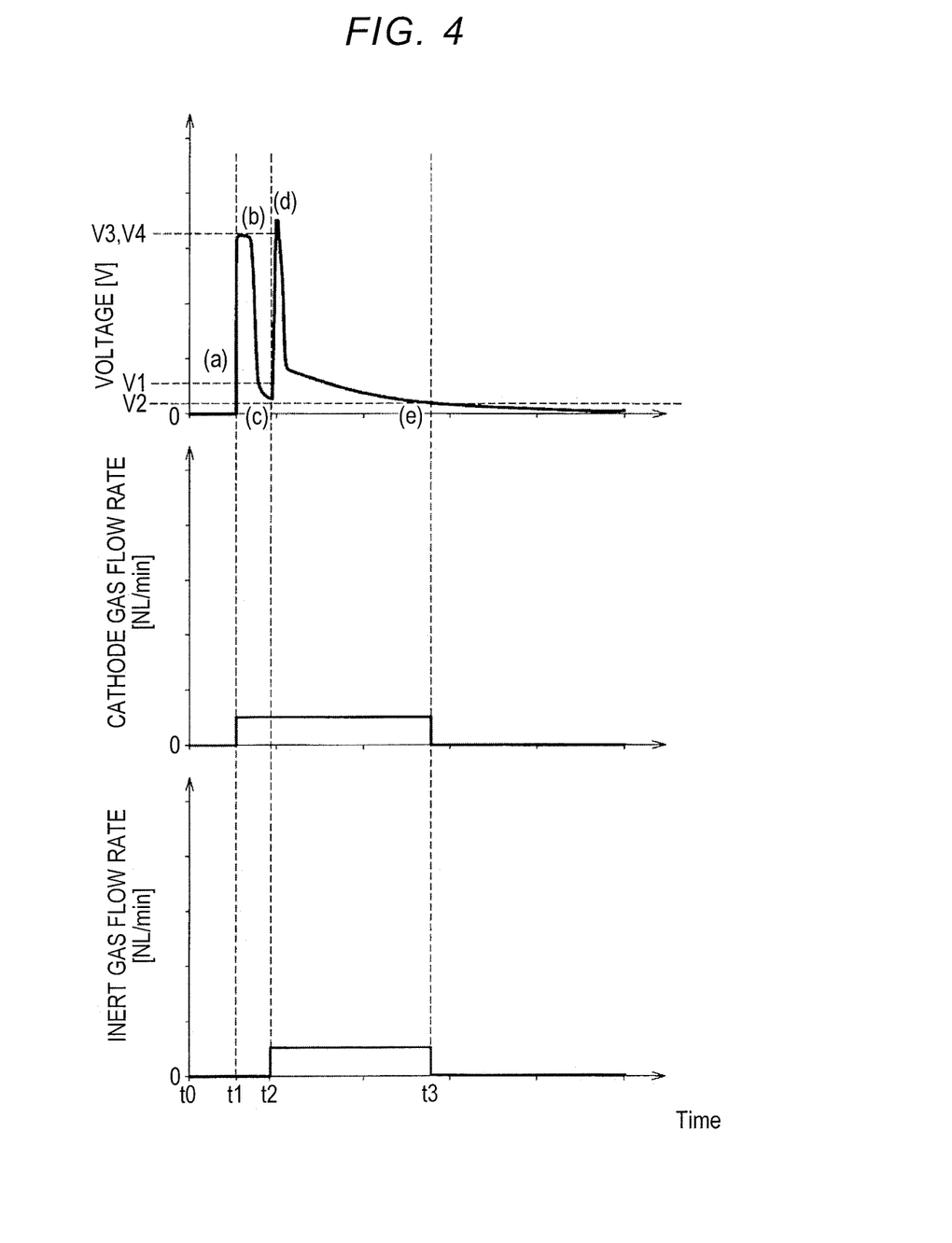
FIG. 4 is a diagram illustrating changes in voltage of a fuel cell stack in preprocessing.
Figure 5:
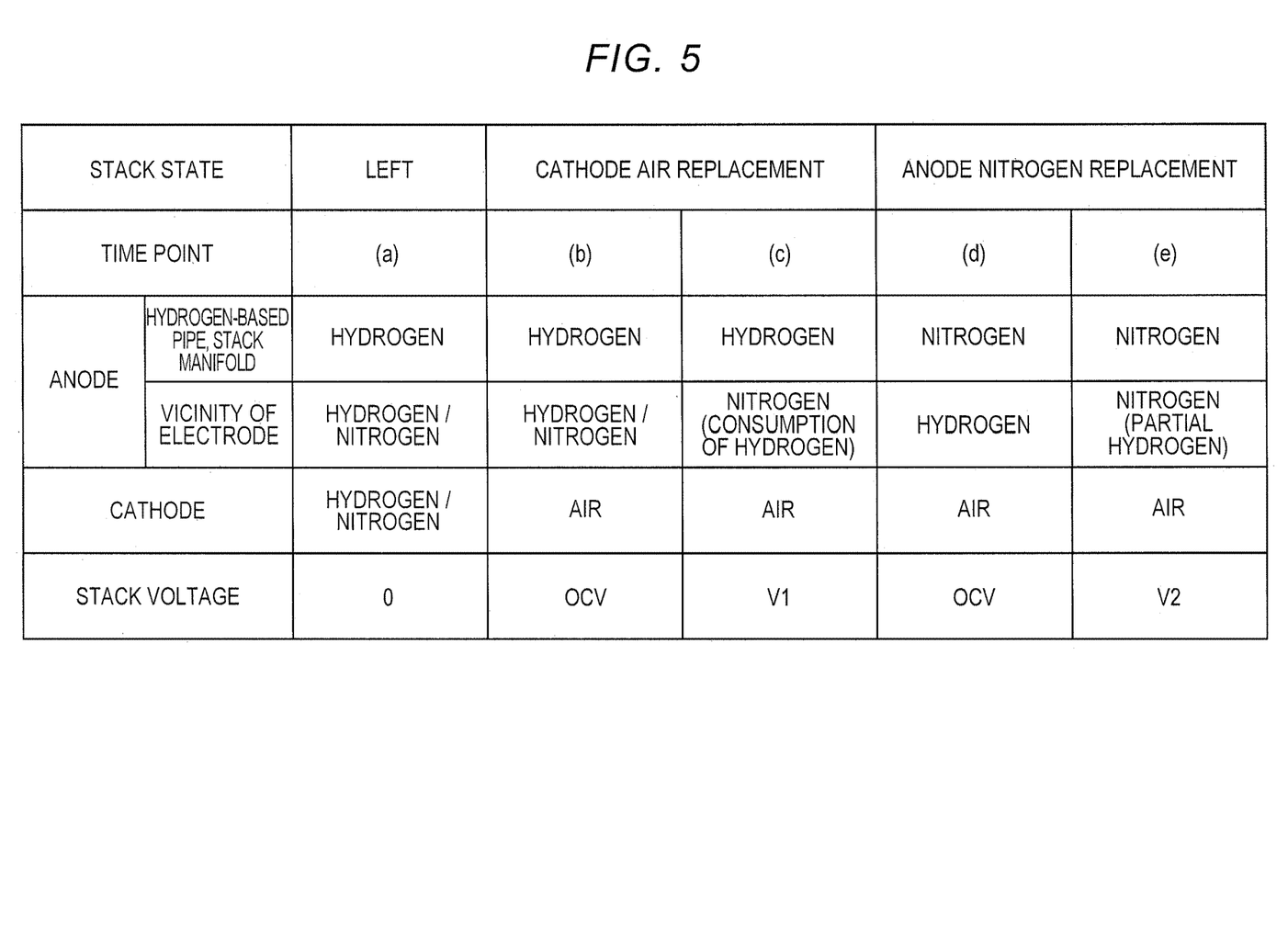
FIG. 5 is a diagram illustrating a relationship between the state of the fuel cell stack, gas in an anode gas supply unit in the fuel cell stack, gas in the vicinity of an anode electrode, gas in the vicinity of a cathode electrode, and the voltage of the fuel cell stack.

Changes in the voltage of the fuel cell stack 10 and changes in the state of the fuel cell stack 10 in the preprocessing will be described below with reference to FIGS. 4 and 5. FIG. 4 is a diagram illustrating changes in the voltage of the fuel cell stack 10 in the preprocessing. FIG. 4 illustrates temporal changes in the voltage of the fuel cell stack 10, the flow rate of the cathode gas supplied to the fuel cell stack 10, and the flow rate of the inert gas supplied to the fuel cell stack 10 in the preprocessing. FIG. 4 illustrates results obtained by a bench test in the preprocessing of the fuel cell system 100. In this test, hydrogen is used as the anode gas, air is used as the cathode gas, and nitrogen is used as the inert gas. FIG. 5 is a diagram illustrating a relationship between the state of the fuel cell stack 10, gas in the anode gas supply unit 50 in the fuel cell stack 10, gas in the vicinity of the anode electrode, gas in the vicinity of the cathode electrode, and the voltage of the fuel cell stack 10.

Time (a) before time t1 in FIG. 4 is a time point at which hydrogen and air are not supplied to the fuel cell stack 10 and the fuel cell stack 10 is left. The voltage of the fuel cell stack 10 at time (a) is 0 V.

When hydrogen and air are not supplied to the fuel cell stack 10, the gas in the vicinity of the electrodes passes through the electrolyte membrane with the lapse of time. Then, hydrogen moving from the anode to the cathode reacts with oxygen in the cathode. Accordingly, as illustrated in FIG. 5, at time (a), hydrogen moving from the anode and nitrogen in the air which is left in the cathode as a result of the reaction between hydrogen and oxygen are in the vicinity of the cathode electrode. Hydrogen and nitrogen moving from the cathode are in the vicinity of the anode electrode. Hydrogen which is supplied to the fuel cell stack 10 before generation of electric power in the fuel cell stack 10 is stopped is in a hydrogen-based pipe which is a flow passage of the anode gas in the anode gas supply unit 50 and the anode gas inlet manifold in the fuel cell stack 10.

Time t1 in FIG. 4 is a time point at which supply of air to the cathode starts (see step S220 in FIG. 3). Since hydrogen in the vicinity of the cathode electrode reacts with air supplied to the cathode, the voltage of the fuel cell stack 10 reaches the open-circuit voltage at time (b) after time t1. The atmosphere in the vicinity of the cathode electrode which is the atmosphere of hydrogen and nitrogen at time (a) is replaced with the atmosphere of air at time (b).

Since hydrogen in the vicinity of the anode electrode reacts with air supplied to the cathode and is consumed, the atmosphere in the vicinity of the anode electrode is changed to the atmosphere of nitrogen at time (c) after time (b) as illustrated in FIG. 5. The voltage of the fuel cell stack 10 which has increased to the open-circuit voltage decreases to the first voltage V1 or lower (see time (c) in FIG. 4).

Time t2 is a time point at which supply of nitrogen to the anode starts (see step S250 in FIG. 3). As illustrated in FIG. 5, the atmosphere of the flow passage of the anode gas and the anode gas inlet manifold of the fuel cell stack 10 which was the atmosphere of hydrogen in time (c) is replaced with the atmosphere of nitrogen at time (d) after time t2. Hydrogen in the flow passage of the anode gas and the anode gas inlet manifold moves to the vicinity of the anode electrode and reacts with air supplied to the cathode. Accordingly, at time (d), the voltage of the fuel cell stack 10 reaches the open-circuit voltage. Since hydrogen in the vicinity of the anode electrode reacts with air supplied to the cathode, the atmosphere in the vicinity of the anode electrode is changed to the atmosphere of nitrogen at time (e) after time (d). The voltage of the fuel cell stack 10 which has increased to the open-circuit voltage decreases to the second voltage V2 or lower because hydrogen in the vicinity of the anode electrode has been consumed (see time (e) in FIG. 4).

Figure 6:
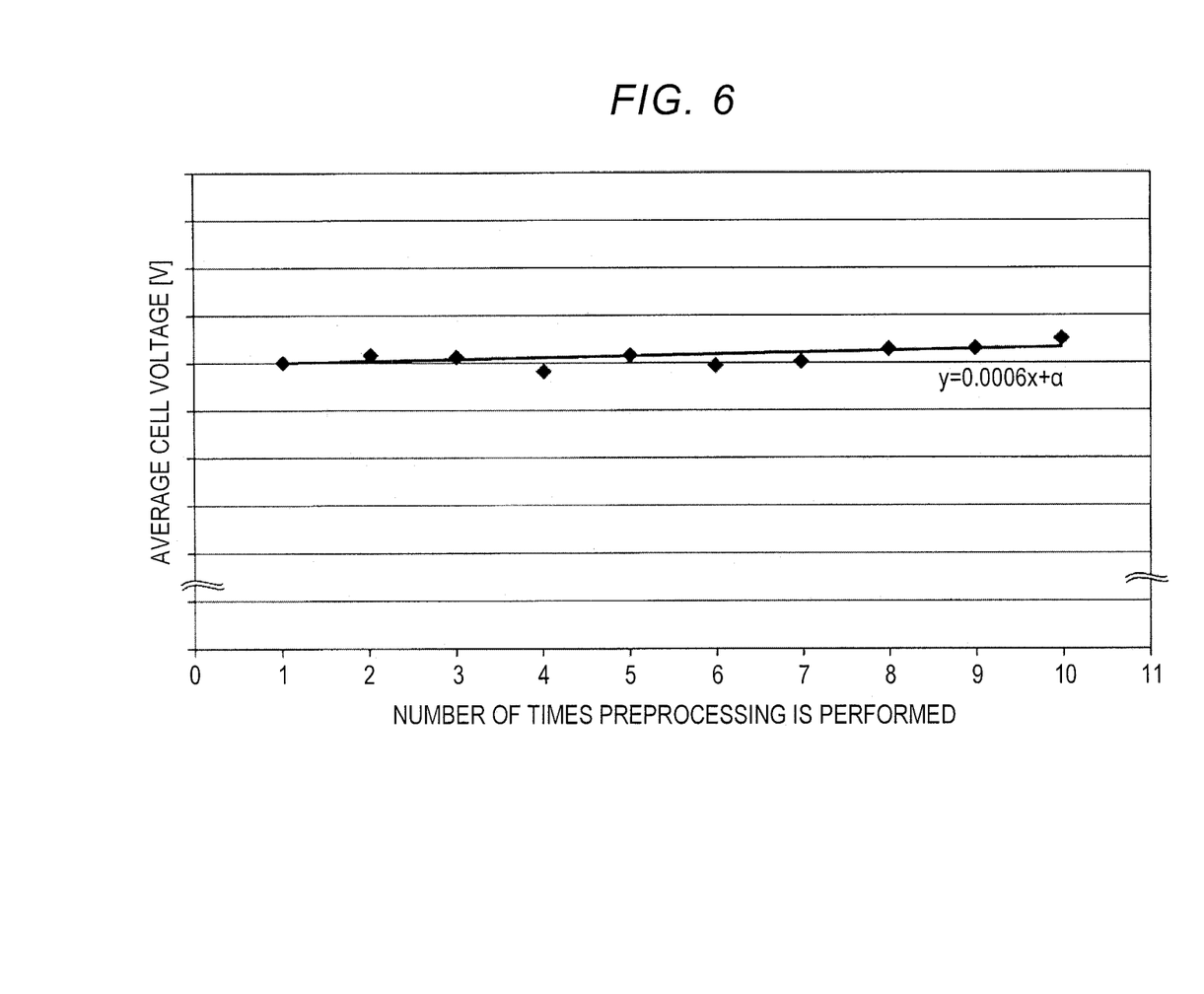
FIG. 6 is a diagram illustrating a relationship between the number of times preprocessing is performed and the average cell voltage in the fuel cell stack after the preprocessing.

FIG. 6 is a diagram illustrating a relationship between the number of times preprocessing is performed and the average cell voltage in the fuel cell stack 10 after the preprocessing. The results of experiment by the inventors show that the average cell voltage of the fuel cell stack 10 hardly changed when the preprocessing was performed repeatedly ten times. This means that deterioration of the cells 11 is curbed in the processing method for the fuel cell system 100 according to the disclosure.

A4. Advantages

As described above, the processing method for the fuel cell system 100 includes the first process, the second process which is performed after the first process, and the third process which is performed after the second process. The first process is a step of starting supply of a cathode gas to the fuel cell stack 10 (see step S220 in FIG. 3). The second process is a step of starting supply of an inert gas to the anode of the fuel cell stack 10 when the voltage of the fuel cell stack 10 increases and then becomes equal to or less than the first voltage (see steps S230 to S250 in FIG. 3). When the voltage of the fuel cell stack 10 increases and then becomes equal to or less than the first voltage V1 after the first process, it means that the anode gas in the vicinity of the electrodes of the fuel cell stack 10 has been consumed. The third process is a step of stopping supply of gas when the voltage of the fuel cell stack 10 increases and then becomes equal to or less than the second voltage (see steps S260 to S280 in FIG. 3). When the voltage of the fuel cell stack 10 increases and then becomes equal to or less than the second voltage after the second process, it means that the anode gas in the anode gas supply unit 50 of the fuel cell system 100 has moved to the vicinity of the electrodes of the fuel cell stack 10 and has been consumed. That is, it means that there is almost no anode gas in the anode gas supply unit 50. Accordingly, through the above-mentioned processes, it can be guaranteed that there is almost no anode gas in the fuel cell system 100.

According to this embodiment, the discharge completion time point of an anode gas in the fuel cell system 100 can be ascertained from changes in the voltage of the fuel cell stack 10 in the fuel cell system 100. Accordingly, it is possible to prevent an inert gas from being unnecessarily supplied to the fuel cell system 100 in order to guarantee that the anode gas has been discharged from the fuel cell system 100. As a result, it is possible to shorten a time required for discharging the anode gas from the fuel cell system 100. Since a period of time during which the anode gas is partially insufficient in the surfaces of the anode in the cells 11 of the fuel cell stack 10 can be shortened, it is possible to curb deterioration of the cells 11.

According to this embodiment, it is possible to safely detach a component from the fuel cell system 100 after the third process. Since the discharge completion time point of the anode gas can be ascertained from changes in the voltage of the fuel cell stack 10, it is possible to earlier start detachment of a component from the fuel cell system 100 in comparison with a case in which the discharge completion time point of the anode gas cannot be ascertained.

B. Second Embodiment

The preprocessing in a second embodiment is different from the preprocessing in the first embodiment, in that the control unit 21 rotates the anode gas pump 65 such that gas discharged from the fuel cell stack 10 circulates to the fuel cell stack 10 in step S250. The control unit 21 rotates the anode gas pump 65 at a rotation speed for supplying an inert gas to a plurality of cells 11 of the fuel cell stack 10 while preventing excessive drying of the electrodes of the fuel cell stack 10. The predetermined rotation speed is acquired by experiment or simulation in advance and is stored in the memory of the control device 20. The predetermined rotation speed may be a rotation speed at which the anode gas pump 65 can achieve supply of gas at about 200 (NL/min). The configuration of the fuel cell system 100 and the processes other than step S250 in the preprocessing are the same as those in the first embodiment and thus description thereof will not be repeated.

According to this embodiment, the inert gas discharged from the fuel cell stack 10 can be supplied again to the fuel cell stack 10. Accordingly, in addition to the advantages in the first embodiment, it is possible to curb the amount of inert gas consumed when the anode gas is discharged from the fuel cell system 100.

According to this embodiment, in comparison with the case in which the anode gas pump 65 is not rotated, the anode gas remaining in the anode gas supply unit 50 can be made to move faster to the fuel cell stack 10. Accordingly, it is possible to further shorten the time required for discharging the anode gas.

C. Other Embodiments

C1. Other Embodiment 1

In the above-mentioned embodiments, in the third process, the control unit 21 may stop rotation of at least one of the cathode gas compressor 33 and the anode gas pump 65 after the voltage of the fuel cell stack 10 has increased to the fourth voltage V4. For example, the control unit 21 may stop rotation of the anode gas pump 65 after time t2 (d) illustrated in FIG. 4. This is because hydrogen moving to the anode electrode by supply of an inert gas to the anode gas supply unit 50 moves to the cathode regardless of the flow rate of the inert gas. According to this embodiment, it is possible to suppress power consumption in the secondary battery 83 when an anode gas is discharged from the fuel cell system 100.

C2. Other Embodiment 2

In the above-mentioned embodiments, the control unit 21 may determine whether the SOC of the secondary battery 83 is equal to or greater than a predetermined threshold value X before start of step S220 (FIG. 3). The threshold value X is a value of the SOC required for an anode gas discharging process and may be acquired by experiment or simulation in advance and be stored in the memory of the control device 20. When the SOC of the secondary battery 83 is equal to or greater than the threshold value X, the process flow may transition to step S220. When the SOC of the secondary battery 83 is lower than the threshold value X, the control unit 21 may control the cathode gas supply unit 30 and the anode gas supply unit 50 such that the fuel cell stack 10 generates electric power to charge the secondary battery 83.

C3. Other Embodiment 3

In the above-mentioned embodiments, when the preprocessing is being performed, the control unit 21 may increase the valve opening time of the discharge valve 63 in comparison with a case in which the preprocessing is not performed or may maintain the open state of the discharge valve 63. According to this embodiment, since an anode gas is consumed in the fuel cell stack 10 and an anode gas included in an anode off-gas is discharged to the outside from the discharge valve 63, an anode gas remaining in the fuel cell system 100 can be earlier replaced with an inert gas. Accordingly, it is possible to shorten the time required for the preprocessing. When the discharge valve 63 is opened, the control unit 21 may control the flow dividing valve 36 such that at least a part of the cathode gas is supplied to the cathode off-gas pipe 41. According to this embodiment, the anode gas which is discharged from the fuel cell system 100 can be diluted by the cathode gas. Accordingly, it is possible to enhance safety in detaching a component.

C4. Other Embodiment 4

In the above-mentioned embodiments, the control unit 21 determines whether the voltage of the fuel cell stack 10 has increased and then has become equal to or less than the first voltage V1 after the first process by determining whether the voltage of the fuel cell stack 10 has reached the third voltage V3 (see step S230 in FIG. 3) and then has become equal to or less than the first voltage V1 (see step S240 in FIG. 3). Alternatively, the control unit 21 may determine whether the voltage of the fuel cell stack 10 has increased and then has become equal to or less than the first voltage V1 by determining whether a rate of change of the voltage of the fuel cell stack 10 has changed from plus to minus and then the voltage has become equal to or less than the first voltage V1. Similarly, the control unit 21 determines whether the voltage of the fuel cell stack 10 has increased and then has become equal to or less than the second voltage V2 after the second process by determining whether the voltage of the fuel cell stack 10 has reached the fourth voltage V4 (see step S260 in FIG. 3) and then has become equal to or less than the second voltage V2 (see step S270 in FIG. 3). Alternatively, the control unit 21 may determine whether the voltage of the fuel cell stack 10 has increased and then has become equal to or less than the second voltage V2 by determining whether a rate of change of the voltage of the fuel cell stack 10 has changed from plus to minus and then the voltage has become equal to or less than the second voltage V2.

C5. Other Embodiment 5

In the above-mentioned embodiments, a pipe for charging the anode gas tank 52 with an anode gas is used as the inert gas pipe 71 for supplying an inert gas to the anode. Alternatively, for example, a pipe may be connected to a part between the second regulator 54 and the injector 55 in the anode gas pipe 51 and an inert gas may be supplied from the inert gas tank 72 using the pipe.

C6. Other Embodiment 6

In the above-mentioned embodiments, the preprocessing which is performed by the control unit 21 is not limited to preprocessing for detaching a component and may be performed, for example, as preprocessing for examination which is performed in a state in which an anode gas has been discharged or for adding a component to the fuel cell system 100. The preprocessing may be applied as a process for guaranteeing that an anode gas has been discharged from the fuel cell system 100.

C7. Other Embodiment 7

In the above-mentioned embodiment, the vehicle 110 in which the fuel cell system 100 is mounted may be a vehicle with four wheels or a vehicle with two wheels. The fuel cell system 100 may be mounted in a ship or a drone, and the fuel cell system 100 may be a stationary system.

The disclosure is not limited to the above-mentioned embodiments and the modified examples and can be embodied in various forms without departing from the gist of the disclosure. For example, technical features of the embodiments and the modified examples corresponding to technical features of the aspects described in the SUMMARY can be appropriately exchanged or combined to solve some or all of the above-mentioned problems or to achieve some or all of the above-mentioned advantages. The elements which are not described in the appended independent claims out of the elements in the above-mentioned embodiments and the modified examples are additional elements and can be appropriately omitted.

What is claimed is:

1. A processing method for a fuel cell system including a fuel cell stack configured to generate electric power when supplied with an anode gas and a cathode gas, the processing method being started in a state in which the fuel cell stack is not supplied with the anode gas and the cathode gas and generation of electric power in the fuel cell stack is stopped, the processing method comprising:
   a first process of starting supply of the cathode gas to the fuel cell stack;
   a second process of starting supply of an inert gas to an anode of the fuel cell stack when a voltage of the fuel cell stack increases and reaches a predetermined third voltage and then becomes equal to or less than a predetermined first voltage after the first process, the first voltage being lower than the third voltage; and
   a third process of stopping the supply of the inert gas when the voltage of the fuel cell stack increases and reaches a predetermined fourth voltage and then becomes equal to or less than a predetermined second voltage after the second process, the second voltage being lower than the fourth voltage.

2. The processing method according to claim 1, wherein a pump that causes an anode off-gas discharged from the fuel cell stack to circulate to the fuel cell stack is rotated at a time of the supply of the inert gas.

3. The processing method according to claim 1, wherein rotation of a pump that causes an anode off-gas discharged from the fuel cell stack to circulate to the fuel cell stack is stopped after the voltage of the fuel cell stack has been reached the fourth voltage in the third process.

4. The processing method according to claim 1, wherein the first process is performed when an SOC of a secondary battery which is electrically connected to the fuel cell stack is equal to or greater than a predetermined threshold value.

5. The processing method according to claim 1, wherein a valve opening time of a discharge valve configured to shut off discharge of an anode off-gas discharged from the fuel cell stack to an outside of the fuel cell system is increased or an open state of the discharge valve is maintained while the first to third processes are being performed.

6. A component detaching method comprising:
   detaching a component of the fuel cell system from the fuel cell system after the processing method according to claim 1 has been performed.

7. The component detaching method according to claim 6, wherein the component includes the fuel cell stack and a pump that causes an anode off-gas discharged from the fuel cell stack to circulate to the fuel cell stack.

8. A fuel cell system comprising:
   a fuel cell stack configured to generate electric power when supplied with an anode gas and a cathode gas;
   an anode gas supply unit configured to supply the anode gas to the fuel cell stack;
   a cathode gas supply unit configured to supply the cathode gas to the fuel cell stack;
   a voltage measuring unit configured to measure a voltage of the fuel cell stack;
   an inert gas supply unit configured to supply an inert gas to an anode of the fuel cell stack; and
   a control unit configured to perform a process of discharging the anode gas from an inside of the fuel cell system to an outside of the fuel cell system,
   wherein the control unit is configured, in a state in which the fuel cell stack is not supplied with the anode gas and the cathode gas and generation of electric power in the fuel cell stack is stopped, to cause the cathode gas supply unit to start supply of the cathode gas to the fuel cell stack,
      to cause the inert gas supply unit to start supply of the inert gas to the anode of the fuel cell stack when the voltage detected by the voltage measuring unit increases and reaches a predetermined third voltage and then becomes equal to or less than a predetermined first voltage after the supply of the cathode gas has been started, the first voltage being lower than the third voltage, and
      to cause the inert gas supply unit to stop the supply of the inert gas when the voltage measured by the voltage measuring unit increases and reaches a predetermined fourth voltage and then becomes equal to or less than a predetermined second voltage after the supply of the inert gas has been started, the second voltage being lower than the fourth voltage.

* * * * *